United States Patent [19]

Gratza

[11] 4,223,906
[45] Sep. 23, 1980

[54] INSTALLATION FOR LOWERING A KICKSTAND ARRANGED ON A MOTORCYCLE

[75] Inventor: Peter Gratza, Munich, Fed. Rep. of Germany

[73] Assignee: Bayerische Motoren Werke Aktiengesellschaft, Fed. Rep. of Germany

[21] Appl. No.: 862,155

[22] Filed: Dec. 19, 1977

[30] Foreign Application Priority Data

Dec. 22, 1976 [DE] Fed. Rep. of Germany ....... 2658056

[51] Int. Cl.² ............................................. B62H 1/02
[52] U.S. Cl. .................................... 280/301; 180/219
[58] Field of Search ............... 280/296, 293, 301–303; 180/30, 33 R, 219; 417/233

[56] References Cited

U.S. PATENT DOCUMENTS

| | | | |
|---|---|---|---|
| 1,300,772 | 4/1919 | Purdy | 180/30 |
| 2,300,762 | 11/1942 | Andrews | 280/301 |
| 3,236,323 | 2/1966 | Austin | 280/293 |
| 3,688,859 | 9/1972 | Hudspeth | 417/233 |
| 3,980,150 | 9/1976 | Gigli | 280/293 |

FOREIGN PATENT DOCUMENTS

| | | | |
|---|---|---|---|
| 548616 | 10/1922 | France | 417/233 |
| 494013 | 10/1938 | United Kingdom | 180/30 |

*Primary Examiner*—John A. Pekar
*Attorney, Agent, or Firm*—Craig & Antonelli

[57] ABSTRACT

An installation for swinging down a kickstand arranged at a motorcycle which is pivotally connected to the frame and is adapted to be swung down into the parking position by means of at least one swivel cylinder adapted to be acted upon with a pressure medium from a pressure reservoir and pivotally connected, on the one hand, at the frame and at the other, at the kickstand; the pressure reservoir is thereby prestressed by a device arranged at the motorcycle which is actuated during the operation of the motorcycle.

19 Claims, 4 Drawing Figures

INSTALLATION FOR LOWERING A KICKSTAND ARRANGED ON A MOTORCYCLE

The present invention relates to an installation for lowering a kickstand arranged at a motorcycle, which is pivotally connected to the frame and is adapted to be swung into the parking position by means of at least one swivel cylinder pivotally connected, on the one hand, at the frame, and on the other, at the kickstand and acted upon with pressure medium from a pressure reservoir.

Such an installation as disclosed, for example, in the German Offenlegungsschrift No. 2,246,594, offers the advantage that the driver is able to stand up or prop up the motorcycle nearly without human effort, which naturally would be very high with heavy motorcycles.

The known installation, however, entails the disadvantage that the pressure reservoir containing the pressure medium has to be always refilled at a filling station. This may be forgotten so that the system does not function; on the other hand, a pressure loss is unavoidable as a rule with such types of systems after the last filling operation, which may have as a consequence, a failure of the installation. However, with a failure of the pressure system, a motorcycle equipped with the prior art installation can no longer be brought into the parking position or be held in the same.

It is the aim of the present invention to so construct an installation of the aforementioned type that the pressure medium present in the pressure reservoir is automatically stressed or pressurized during the driving operation.

The underlying problems are solved according to the present invention in that the pressure reservoir or pressure storage device is prestressed by an installation arranged at the motorcycle, which is actuated during the operation of the engine and/or during the driving operation of the motorcycle.

For example, the exhaust gases, the vacuum of the engine or the dynamic pressure resulting during the drive of the motorcycle may serve as energy source for the installation prestressing the pressure reservoir or pressure storage device. With another particularly preferred embodiment of the present invention, the pressure reservoir is prestressed by a pump arranged at the motorcycle which is actuated during the inward and/or outward spring deflection of the radius arm or of the telescopic fork.

In addition to avoiding the disadvantages of the prior art installation, it is advantageous with the present invention that no additional energy is necessary for prestressing the pressure reservoir or pressure storage device since, in each case, the energy is utilized which is produced during the operation of the engine or during the driving operation of the motorcycle. Furthermore, an advantage of the present invention resides in that after each operation of the motorcycle, the pressure reservoir has always been automatically prestressed.

Accordingly, it is an object of the present invention to provide an installation for actuating a kickstand of a motorcycle which avoids by simple means the aforementioned shortcomings and drawbacks encountered in the prior art.

Another object of the present invention resides in a kickstand actuating installation for motorcycle which obviates the need for refilling the pressure storage device at a filling station.

A further object of the present invention resides in an installation for lowering a kickstand of a motorcycle which not only minimizes the danger of failure of the installation but additionally is simple in construction and reliable in operation.

A still further object of the present invention resides in an installation for motorcycle kickstands of the type described above which utilizes already existing energy produced during the operation of the motorcycle to prestress the pressure storage device.

These and other objects, features and advantages of the present invention will become more apparent from the following description when taken in connection with the accompanying drawing which shows, for purposes of illustration only, one embodiment in accordance with the present invention, and wherein.

Figure 1:
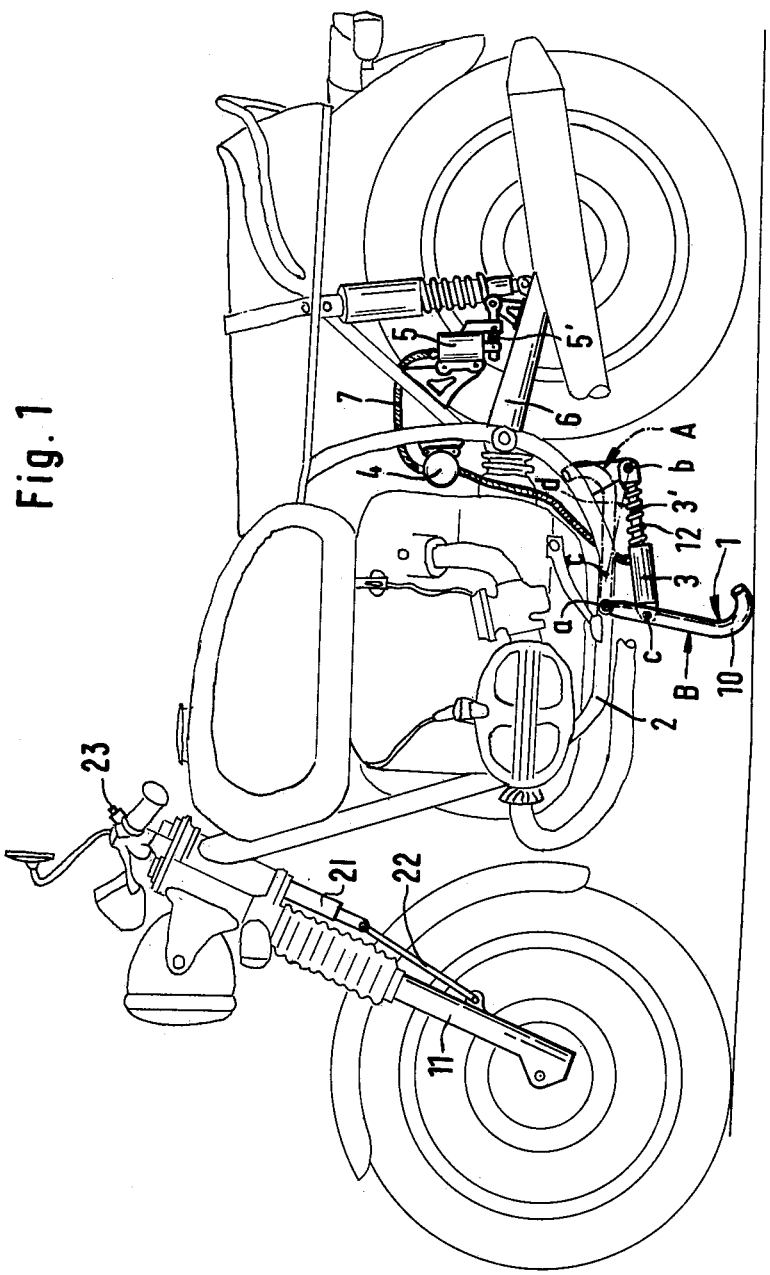
FIG. 1 is a side elevational view of a motorcycle whose kickstand is actuated by an installation according to the present invention.

Referring now to the drawing wherein like reference numerals are used throughout the various views to designate like parts, a motorcycle illustrated in FIG. 1 is equipped with a kickstand generally designated by reference numeral 1 which is pivotally connected to the frame 2. A swivel cylinder 3 is used to swing or pivot the kickstand 1 from the driving position A, indicated in dash lines, down into the parking position B, shown in full lines, which swivel cylinder is pivotally connected, on the one hand, with its piston rod 3' at the frame 2 and, on the other hand, with its cylinder housing at the kickstand 1.

The swivel cylinder 3 which is acted upon by pressure oil and is effective as pressure cylinder is fed from a pressure reservoir or pressure storage device 4 of any known construction fixedly arranged on the frame, which, in its turn, is fed by a pump 5 mounted at the frame 2. The pump 5 is provided with a transmission lever 5' that is pivotally connected with a radius arm 6. The radius arm 6 which is pivotally connected at the frame 2 and is adapted to pivot up and down, oscillates during the driving operation of the motorcycle and thereby actuates the pump 5 which sucks-in the pressure oil from a pressure medium tank or sump 15 schematically illustrated in FIG. 4, and feeds the same by way of a pressure line 7 to the pressure reservoir or pressure storage device 4 and from the latter to the swivel cylinder 3 under interconnection of a pressure limit valve 8, of a throttle 20 and of a control valve 9. Similarly, the pump 5 may also be actuated by the front telescope fork 11 or possibly also by a rear telescoping fork or by a shock absorber of the motorcycle. In the lefthand portion of FIG. 1 a pump 21 is shown wherein a transmission lever 22 is pivotally connected with the telescope fork 11 which oscillates during the driving operation. The drive connection of the pump 5 may be constructed disconnectible so that the pump may be selectively rendered inoperable, for example, during longer motorcycle drives. It is also possible by the use of conventional means to construct the drive connection of the pump disconnectible in dependence on the maximum pressure of the pressure medium.

Figure 2:
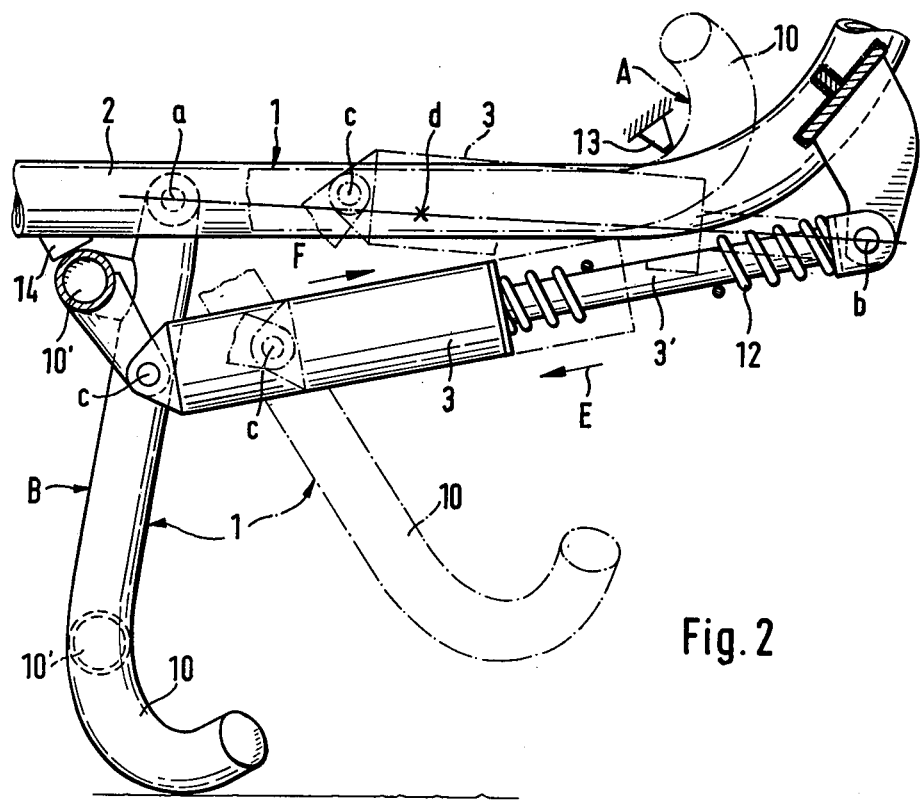
FIG. 2 is a side elevational view, partly in cross section, on an enlarged scale, illustrating details of the kickstand in accordance with the present invention whereby difficult pivoted positions thereof are illustrated in this figure.
Figure 3:
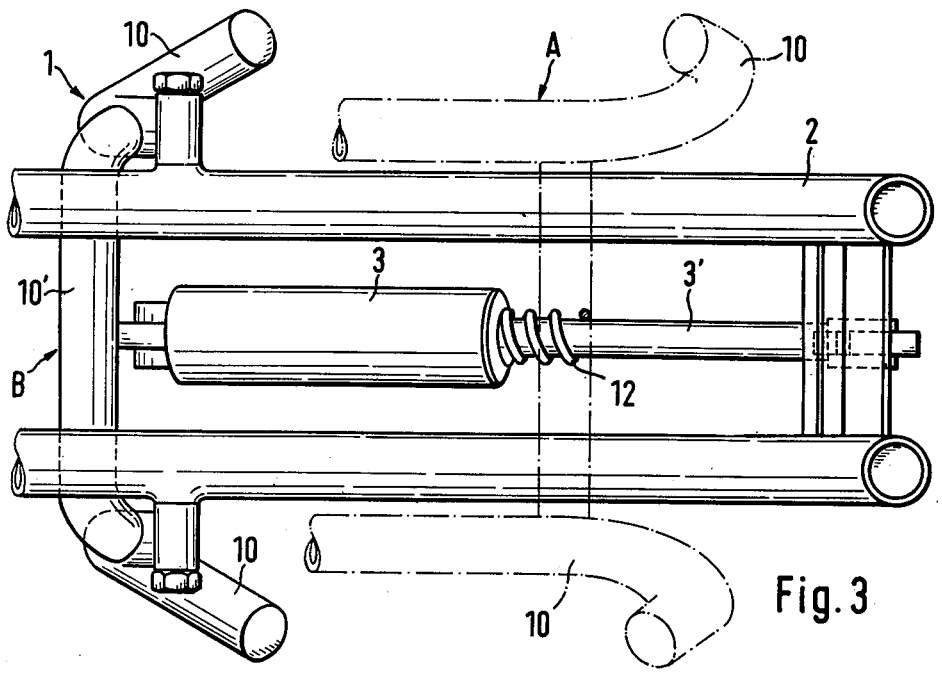
FIG. 3 is a plan view on FIG. 2.

As shown in FIG. 2, a compression spring 12 is arranged on the piston rod 3' of the swivel cylinder 3, which is supported, on the one hand, at the frame 2 and, on the other, at the cylinder housing of the swivel cylinder 3. The kickstand 1 is loaded by the compression spring 12 both in its driving position designated by reference character A as also in the parking position designated by reference character B. The respective end positions of the kickstand 1 is limited by abutments 13 and 14. The kickstand 1 consists of two girder members 10 which are connected with each other by two transverse connecting members 10' disposed one above the other.

The pivot axis of the kickstand 1 at the frame is designated in FIG. 2 by a, the point of pivotal connection of the swivel cylinder 3 on the side of the frame by b and the point of pivotal connection of the pivot cylinder 3 at the kickstand 1 by c. An ideal connecting line d exists between the pivot axis a of the kickstand 1 and the point of pivotal connection b of the swivel cylinder 3 on the side of the frame. With a swung-up kickstand 1, i.e., disposed in the driving position A, the point of pivotal connection c lies above the connecting line d. It is achieved by this measure that the kickstand 1 is held in the driving position A by the mere spring action of the compression spring 12 directed, on the one hand, against the point of pivotal connection b and, on the other, against the point of pivotal connection c, whereby the girder members 10 each abut at an abutment 13.

The kickstand 1 is displaced into the parking position B in that it is pivoted down or swung out from the driving position A initially by muscle power up to a point slightly beyond the connecting line d; if the point of pivotal connection c of the pivot cylinder 3 which thereby pivots about the pivot axis a along a circular arc is congruent with the connecting line d, the pivotal connection system consisting of the parts 1, 3, and 3' is thereby in the dead-center position; until the dead-center position is reached, the compression spring 12 is compressed. After passing the dead-center position in the direction toward the road surface, the kickstand 1 is now swung or pivoted down automatically up to about the area of the road surface owing to the spring force of the compression spring 12 which now becomes effective.

Figure 4:
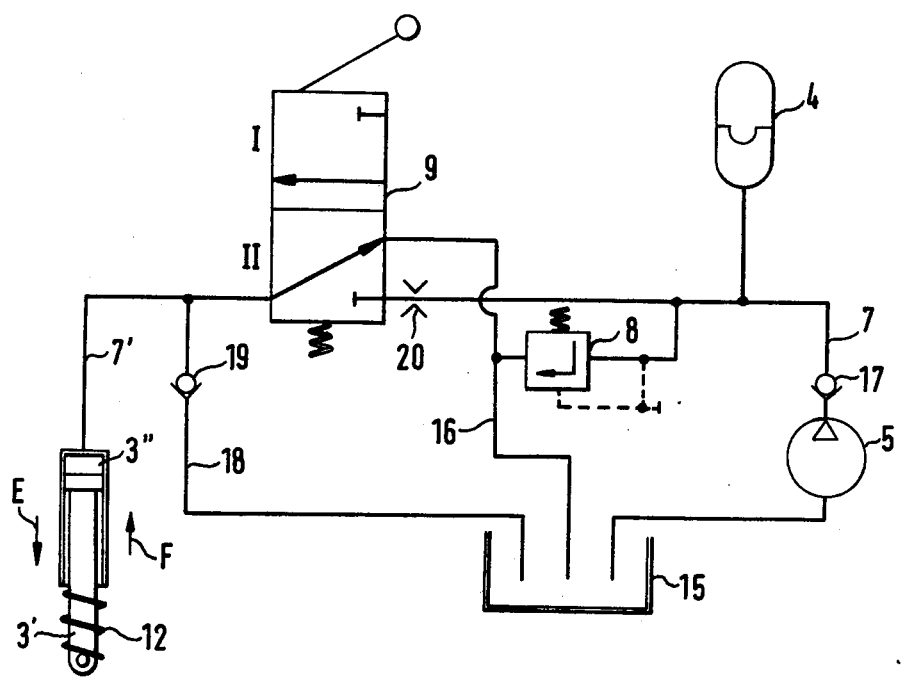
FIG. 4 is a schematic diagram of the hydraulic system in accordance with the present invention.

In this position takes place the hydraulic actuation of the swivel cylinder 3 and therewith the further pivotal movement of the kickstand 1 into its parking position B. A schematic diagram of the hydraulic system is illustrated in FIG. 4. The control valve 9 actuated by means of a pushbutton switch 23 or the like—which is appropriately arranged at the handlebar of the motorcycle—remains during the actuation of the push-button switch in the shifting position I and after the release thereof returns automatically back into the shifting position II. If the control valve 9 is in this shifting position II, then the pressure oil supplied as mentioned hereinabove by the pump 5, is fed by way of the pressure line 7 into the pressure reservoir or pressure storage device 4 whose compressible energy-storing means—a gas or a mechanical spring—is prestressed thereby up to a maximum pressure. In case this maximum pressure is exceeded as a result of a continuing actuation of the pump 5, the pressure limit valve 8 which may possibly be constructed adjustable, responds and the pressure oil can flow back by way of the return line 16 into the pressure medium tank or sump 15. However, it is also feasible within the scope of the present invention to actuate the control valve 9 by a control contact which, in its turn, cooperates with the swivel cylinder 3 when pivoting down.

In the shifting position I of the control valve 9, the pressure reservoir or storage device 4 is in communication with the pressure space 3" of the swivel cylinder 3 by way of the pressure lines 7 and 7' so that the piston rod 3' is extended in the direction E by the pressure oil present in the pressure reservoir or storage device 4 and fed into the pressure space 3" by the prestressed energy-storing means thereof, and therewith the kickstand 1 is pivoted into the parking position B, whereas a check valve 17 interconnected in the pressure line 7 closes in the direction toward the pump 5. The end position of the downward pivot movement of the kickstand 1 is limited by the abutment 14.

A refill suction line 18 leading to the pressure medium sump 15 terminates in the pressure line 7' leading from the control valve 9 to the pressure space 3" of the swivel cylinder 3, and is provided with a check valve 19 opening in the direction toward the pressure space 3". The refill suction line 18 enables fresh oil to be sucked-in out of the pressure medium sump 15 by the vacuum resulting in the pressure space 3" of the swivel cylinder 3 when the kickstand 1 pivots down between the dead-center position of the pivotal connecting system and the area of the road surface, whereby considerably smaller pressure losses result due to the by-pass of the control valve 9 and the kickstand 1 can be swung out or pivoted down somewhat more effortlessly.

The pivoting movement of the kickstand 1 from the parking position B into the driving position A takes place in a known manner by muscle power, whereby the motorcycle is most appropriately pushed so far in the driving direction until the kickstand 1 is swung or pivoted into the area of the road surface plane; thereupon, the kickstand 1 is pivoted or swung up by muscle power up to the area of the dead-center position of the pivotal connecting system, whereby the compression spring 12 is continuously compressed. With an upward pivoting of the kickstand which takes place beyond the dead-center position of the pivotal connecting system, the spring force of the compression spring 12 which was stored during the preceding upward pivoting movement of the kickstand 1, commences to unstress or release, whereby the kickstand 1 is pivoted by the spring force up to its end position limited by the abutment 13 and is retained in this position during the driving operation of the motorcycle always spring-loaded. During the upward pivoting movement of the kickstand 1, the piston rod 3' of the swivel cylinder 3 is displaced in the direction of arrow F, and the pressure oil present in the pressure space 3" is expelled, which flows back into the pressure medium sump 15 by way of the lines 7' and 16.

In case of failure of the hydraulic actuation of the swivel cylinder 3, the kickstand 1 can be pivoted into the parking position B by muscle power in the usual manner.

Within the scope of the present invention, air may also be used as pressure medium for actuating the swivel cylinder. The installation according to the present invention can also be installed into already existing motorcycles with slight expenditures in work and costs.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for swinging down a kickstand arranged at a motorcycle comprising a kickstand which is pivotally supported on the frame of a motorcycle and which is adapted to be pivoted into a parking position, cylinder means pivotally connected between the frame of the motorcycle and the kickstand for pivoting said kickstand toward said parking position in response to actuation of said cylinder means, pressure storage means for storing a pressure medium for actuating said cylinder means, pump means arranged on the motorcycle for supplying said pressure storage means with pressure medium, said pump means being actuated by oscillatory movements of the motorcycle, and control valve means being located between said pressure storage means and said cylinder means for controlling the supply of pressure medium from said pressure storage means to the cylinder means for actuating said cylinder means.

2. An installation according to claim 1, characterized in that said pump means is actuated by the movement of a wheel suspension element of the motorcycle relative to the motorcycle frame.

3. An installation according to claim 2, characterized in that said wheel suspension element is a radius arm.

4. An installation according to claim 2, characterized in that said wheel suspension element is a telescope fork.

5. An installation according to claim 2, characterized in that the pump means is secured to the frame and is drivingly connected with said wheel suspension element by way of at least one transmission lever.

6. An installation according to claim 5, characterized in that a spring means acts on the kickstand which spring-loads the kickstand into its driving position and after deflection of the kickstand beyond a dead-center position, in the direction toward the road surface.

7. An installation according to claim 6, characterized in that the spring means is a compression spring which is supported between the pivotally connected end of a piston rod of said cylinder means and, a cylinder housing of the swivel cylinder means constructed as pressure cylinder.

8. An installation according to claim 7, characterized in that the point of pivotal connection of the cylinder means with the kickstand is located above the connecting line between the pivot axis of the kickstand and the point of pivotal connection of the cylinder means with the frame, when the kickstand is retracted in its driving position, whereas after passing the dead-center position as a result of a further downward pivoting movement of the kickstand, the point of pivotal connection of the cylinder means at the kickstand is located below said connecting line.

9. An installation according to claim 8, wherein said control valve means is positioned in a connecting line between said pressure storage means and the cylinder means, characterized in that the control valve means in the actuating position thereof, connects the pressure storage means with a pressure space of the cylinder means and in the rest position closes off the pressure storage means and connects the pressure space with a pressure medium tank.

10. An installation according to claim 9, characterized in that a refill suction line terminates in the pressure line leading from the control valve means to the pressure space of the cylinder means, said suction line being connected with the pressure medium tank and having a check valve opening in the direction toward the pressure space.

11. An installation according to claim 10, characterized in that the control valve means is actuatable from the handlebar of the motorcycle.

12. An installation according to claim 11 with a drive connection for the pump means, characterized in that the drive connection of the pump means is a separable connection.

13. An installation according to claim 5, characterized in that the point of pivotal connection of the cylinder means at the kickstand is located above the connecting line between the pivot axis of the kickstand and the point of pivotal connection of the cylinder means at the frame, when the kickstand is retracted in its driving position, whereas after passing the dead-center position as a result of a further downward pivoting movement of the kickstand, the point of pivotal connection of the cylinder means at the kickstand is located below said connecting line.

14. An installation according to claim 5, with a drive connection for the pump means, characterized in that the drive connection of the pump means is a separable connection.

15. An installation according to claim 1, characterized in that a spring means acts on the kickstand which spring-loads the kickstand into its driving position and after deflection of the kickstand beyond a dead-center position, in the direction toward the road surface.

16. An installation according to claim 15, characterized in that the spring means is a compression spring which is supported between the pivotally connected end of the piston rod and, the cylinder housing of the cylinder means constructed as pressure cylinder.

17. An installation according to claim 1, wherein said control valve means is positioned in a connecting line between said pressure storage means and the cylinder means, characterized in that the control valve means in the actuating position thereof, connects the pressure storage means with a pressure space of the cylinder means and in the rest position closes off the pressure storage means and connects the pressure space with a pressure medium tank.

18. An installation according to claim 17, characterized in that a refill suction line terminates in the pressure line leading from the control valve means to the pressure space of the cylinder means, said suction line being operatively connected with the pressure medium tank and having a check valve opening in the direction toward the pressure space.

19. An installation according to claim 18, characterized in that the control valve means is actuatable from the handlebar of the motorcycle.

* * * * *